United States Patent
Aihara et al.

(10) Patent No.: US 11,898,024 B2
(45) Date of Patent: *Feb. 13, 2024

(54) LATEX COMPOSITION

(71) Applicant: ZEON CORPORATION, Tokyo (JP)

(72) Inventors: Shunjin Aihara, Tokyo (JP); Junji Kodemura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 339 days.

This patent is subject to a terminal disclaimer.

(21) Appl. No.: 16/482,069

(22) PCT Filed: Feb. 9, 2018

(86) PCT No.: PCT/JP2018/004677
§ 371 (c)(1),
(2) Date: Jul. 30, 2019

(87) PCT Pub. No.: WO2018/155243
PCT Pub. Date: Aug. 3, 2018

(65) Prior Publication Data
US 2020/0056019 A1 Feb. 20, 2020

(30) Foreign Application Priority Data
Feb. 22, 2017 (JP) ................. 2017-030938

(51) Int. Cl.
| C08L 15/00 | (2006.01) |
| C08K 5/38 | (2006.01) |
| C08J 5/18 | (2006.01) |
| C09J 115/00 | (2006.01) |
| C08K 3/22 | (2006.01) |

(52) U.S. Cl.
CPC .............. *C08L 15/00* (2013.01); *C08J 5/18* (2013.01); *C09J 115/00* (2013.01); *C08J 2315/00* (2013.01); *C08K 2003/2296* (2013.01); *C08L 2201/52* (2013.01); *C08L 2203/16* (2013.01)

(58) Field of Classification Search
CPC .............. C08K 5/30; C08K 5/38; C08L 15/00
See application file for complete search history.

(56) References Cited

U.S. PATENT DOCUMENTS

| 3,988,275 A * | 10/1976 | Satake ............ C08K 5/521 524/145 |
| 4,036,804 A * | 7/1977 | Hirai ........................ B32B 7/12 524/565 |
| 4,141,875 A | 2/1979 | Brizzolara et al. |
| 5,444,118 A * | 8/1995 | Tsuruoka ............ C08F 236/04 524/828 |
| 2002/0120055 A1* | 8/2002 | Scholl ..................... C08K 3/06 524/543 |
| 2009/0199945 A1* | 8/2009 | Galimberti ............ C08K 3/346 524/426 |
| 2012/0021155 A1 | 1/2012 | Chen et al. |
| 2015/0128329 A1 | 5/2015 | Amarasekera et al. |
| 2015/0210880 A1 | 7/2015 | Chen et al. |
| 2015/0272245 A1 | 10/2015 | Khor et al. |
| 2015/0376322 A1 | 12/2015 | Nakamura et al. |
| 2016/0137868 A1 | 5/2016 | Chen et al. |
| 2017/0145185 A1 | 5/2017 | Chen et al. |
| 2017/0298210 A1 | 10/2017 | Joe et al. |

FOREIGN PATENT DOCUMENTS

| CN | 104419042 A * | 3/2015 | ........... A41D 19/015 |
| EP | 1 215 236 A2 | 6/2002 | |
| EP | 1 650 237 A1 | 4/2006 | |
| EP | 2 960 293 A1 | 12/2015 | |
| GB | 685709 A * | 1/1953 | |
| JP | S50-022047 A | 3/1975 | |
| JP | S50-074640 A | 6/1975 | |
| JP | S50-074642 A | 6/1975 | |
| JP | 2013-534555 A | 9/2013 | |
| WO | 2014/129547 A1 | 8/2014 | |
| WO | 2015/006807 A1 | 1/2015 | |
| WO | 2016/105112 A1 | 6/2016 | |
| WO | 2018/111087 A1 | 6/2018 | |

OTHER PUBLICATIONS

Apr. 20, 2021 Office Action issued in Indonesian Patent Application No. PID201906618.
Sep. 15, 2020 European Search Report issued in European Patent Application No. 18756769.8.
Aug. 27, 2019 International Preliminary Report on Patentability issued in International Patent Application No. PCT/JP2018/004677.
Mar. 27, 2018 International Search Report issued in International Patent Application No. PCT/JP2018/004677.
Oct. 7, 2021 Office Action issued in Indonesian Patent Application No. PID201906618.
Mar. 25, 2022 Office Action issued in Malalysian Application PI2019004476.
Jun. 10, 2022 Office Action issued in Malaysian Patent Application No. PI2019004476.

* cited by examiner

*Primary Examiner* — Vickey Nerangis
(74) *Attorney, Agent, or Firm* — Oliff PLC

(57) ABSTRACT

A latex composition contains a carboxy-modified conjugated diene polymer latex, a xanthogen compound, and a metal oxide.

8 Claims, No Drawings

LATEX COMPOSITION

TECHNICAL FIELD

The present invention relates to a latex composition, further specifically, to a latex composition that has excellent stability as a latex composition and is capable of suppressing the onset of symptoms of delayed allergy (Type IV) in addition to immediate allergy (Type I) and yielding a molded film such as a dip-molded product that is excellent in tensile strength and elongation, and to an adhesive layer-forming substrate using the latex composition.

BACKGROUND ART

Conventionally, it is known that dip-molded products used in contact with human bodies, such as nipples, balloons, gloves, balloons, and stalls, are obtained by dip-molding a latex composition containing natural rubber latex. However, natural rubber latex contains proteins that cause symptoms of intermediate allergy (Type I) in human bodies and therefore may be problematic or dip-molded products that directly contact the mucosa or organs of living bodies. Therefore, use of a synthetic rubber latex instead of a natural rubber latex has been studied.

For example, Patent Document 1 discloses a latex composition mixing zinc oxide, sulfur, and a vulcanization accelerator with latex of synthetic polyisoprene that is synthetic rubber as a composition for dip molding. However, the technique of Patent Document 1 can prevent the onset of immediate allergy (Type I) due to proteins derived from natural rubber, whereas it nay sometimes cause allergic symptoms of delayed allergy (Type TV), when the latex composition is formed as a dip-molded product and contacts with human bodies, due to the vulcanization accelerator contained in the dip-molded product.

RELATED ART DOCUMENTS

Patent Documents

Patent Document 1: International Publication No. WO 2014/129547

SUMMARY OF THE INVENTION

Problem to be Solved by the Invention

The present invention has been devised in view of such an actual situation, and an object thereof is to provide a latex composition that has excellent stability as a latex composition and is capable of suppressing the onset of symptoms of delayed allergy (Type IV) in addition to immediate allergy (Type I) and yielding a molded film such as a dip-molded product that is excellent in tensile strength and elongation, and an adhesive layer-forming substrate using the latex composition.

Means for Solving the Problem

As a result of dedicated research to achieve the aforementioned object, the inventors have found that the aforementioned object can be achieved by a latex composition mixing a xanthogen compound and a metal oxide with a carboxy-modified conjugated diene polymer latex, thereby accomplishing the present invention.

That is, the present invention provides a latex composition comprising a carboxy-modified conjugated diene polymer latex, a xanthogen compound, and a metal oxide.

In the present invention, a modification rate by carboxyl groups, as calculated based on (the number of carboxyl groups/the total number of monomer units of the carboxy-modified conjugated diene polymer)×100 is preferably 0.01 to 10%.

In the present Invention, the carboxy-modified conjugated diene polymer is preferably carboxy-modified synthetic polyisoprene.

In the present invention, the content of the xanthogen compound is preferably 0.01 to 10 parts try weight, with respect to 100 parts by weight of the carboxy-modified conjugated diene polymer.

In the present invention, the xanthogen compound is preferably isopropyl xanthate and/or butyl xanthate.

The present invention preferably further comprises a sulfur vulcanizing agent.

The present invention further provides a molded film comprising the aforementioned latex composition.

Further, the present invention provides an adhesive layer-forming substrate obtained by forming an adhesive layer comprising the aforementioned latex composition on a surface of a substrate.

Effects of Invention

The present invention can provide a latex composition that has excellent stability as a latex composition and is capable of suppressing the onset of symptoms of delayed allergy (Type IV) in addition to immediate allergy (Type I) and yielding a molded film such as a dip-molded product that is excellent in tensile strength and elongation, and an adhesive layer-forming substrate using the latex composition.

DESCRIPTION OF EMBODIMENTS

The latex composition of the present invention contains a carboxy-modified conjugated diene polymer latex, a xanthogen compound, and a metal oxide.

The carboxy-modified conjugated diene polymer latex used in the present invention is a carboxy-modified conjugated diene polymer latex obtained by modifying a conjugated diene polymer with a monomer having a carboxyl group or a carboxy-modified conjugated diene polymer latex obtained by copolymerizing ethylenically unsaturated carboxylic acid monomers.

Conjugated Diene Polymer

The conjugated diene polymer is not specifically limited, but examples thereof include a synthetic polyisoprene, a styrene-isoprene-styrene block copolymer (SIS), a natural rubber, a nitrile group-containing conjugated diene copolymer, and the like. Among these, those containing an isoprene unit such as a synthetic polyisoprene, a SIS, and a natural rubber are preferable, and a synthetic polyisoprene is particularly preferable.

In the case of using a natural rubber as the conjugated diene polymer, it is preferable to use a natural rubber with proteins removed.

In the case of using a synthetic polyisoprene as the conjugated diene polymer, the synthetic polyisoprene may be an isoprene homopolymer or may be a copolymer of isoprene with another ethylenically unsaturated monomer that is copolymerizable with isoprene. The content of isoprene units in the synthetic polyisoprene is preferably 70 wt % or more, more preferably 90 wt % or more, further preferably 95 wt % or more, particularly preferably 100 wt % (homopolymer of isoprene) with respect to all monomer units, for ease of obtaining a molded film such as dip-molded product that is flex and has excellent tensile strength.

Examples of the other ethylenically unsaturated monomers that are copolymerizable with isoprene include conjugated diene monomers other than isoprene such as butadiene, chloroprene, and 1,3-pentadiene; ethylenically unsaturated nitrile monomers such as acrylonitrile, methacrylonitrile, fumaronitrile, and α-chloroacrylonitrile; vinyl aromatic monomers such as styrene and alkyl styrene; and ethylenically unsaturated carboxylic acid ester monomers such as methyl (meth) acrylate (which means "methyl acrylate and/or methyl methacrylate", and the same hereinafter applies to ethyl (meth) acrylate and the like), ethyl (meth) acrylate, butyl (meth) acrylate, and (meth) acrylic acid-2-ethylhexyl. One of these other ethylenically unsaturated monomers that are copolymerizable with isoprene may be used alone, or a plurality of them may be used in combination.

The synthetic polyisoprene can be obtained by a conventionally known method, for example, by solution polymerization of isoprene with other ethylenically unsaturated copolymerizable monomers used as required, in an inert polymerization solvent, using a Ziegler polymerization catalyst composed of trialkylaluminum-titanium tetrachloride or an alkyl lithium polymerization catalyst such as n-butyl lithium and sec-butyl lithium. The polymer solution of the synthetic polyisoprene Obtained by the solution polymerization may be used as it is for producing the synthetic polyisoprene latex but can be used also for producing the synthetic polyisoprene latex by extracting a solid synthetic polyisoprene from the polymer solution and thereafter dissolving it in an organic solvent. As described below, the synthetic polyisoprene latex can be used for producing the carboxy-modified conjugated diene polymer latex used in the present invention.

In the case where a polymer solution of synthetic polyisoprene is obtained by the aforementioned method, impurities such as residues of a polymerization catalyst remaining in the polymer solution may be removed. Further, an anti-aging agent, which will be described below, may be added into the solution during the polymerization or after the polymerization. Further, a commercially available solid synthetic polyisoprene also can be used.

There are four types of the isoprene units in the synthetic polyisoprene, depending on the bonding state of isoprene, which are cis bond units, trans bond units, 1,2-vinyl bond units, and 3,4-vinyl bond units. For improving the tensile strength of a molded film such as a dip-molded molded product to be obtained, the content proportion of the cis bend units in the isoprene units contained in the synthetic polyisoprene is preferably 70 wt % or more, more preferably 90 wt % or more, further preferably 95 wt % or more, with respect to all isoprene units.

The weight-average molecular weight of the synthetic polyisoprene is preferably 10,000 to 5,000,000, more preferably 500,000 to 5,000,000, further preferably 800,000 to 3,000,000, in terms of standard polystyrene by gel permeation chromatography. Adjusting the weight-average molecular weight of the synthetic polyisoprene to the aforementioned range tends to improve the tensile strength of the molded film such as a dip-molded product and facilitate the production of the synthetic polyisoprene latex.

Further, the polymer/Mooney viscosity ($ML_{1+4}$ at 100° C.) of the synthetic polyisoprene is preferably 50 to 80, more preferably 60 to 80, further preferably 70 to 80.

As a method for obtaining a synthetic polyisoprene latex, there are (1) a method for producing a synthetic polyisoprene latex by emulsifying a solution or a microsuspension of a synthetic polyisoprene dissolved or finely dispersed in an organic solvent, in water in the presence of an anionic surfactant, followed by removal of the organic solvent, as required, and (2) a method for directly producing a synthetic polyisoprene latex by emulsion polymerization or suspension polymerization of isoprene alone or a mixture of isoprene with an ethylenically unsaturated monomer that is copolymerizable with isoprene, in the presence of an anionic surfactant. The aforementioned production method (1) is preferable since the synthetic polyisoprene with cis bond units at a high proportion in the isoprene units can be used, and a molded film such as a dip-molded product having excellent mechanical properties such as tensile strength is easily obtained.

Examples of the organic solvent used in the aforementioned production method (1) include aromatic hydrocarbon solvents such as benzene, toluene, and xylene; alicyclic hydrocarbon solvents such as cyclopentane, cyclopentene, cyclohexane, and cyclohexene; aliphatic hydrocarbon solvents such as pentane, hexane, and heptane; and halogenated hydrocarbon solvents such as methylene chloride, chloroform, and ethylene dichloride. Among these, alicyclic hydrocarbon solvents are preferable, and cyclohexane is particularly preferable.

The amount of the organic solvent to be used is preferably 2,000 parts by weight or less, more preferably 20 to 1,500 parts by weight, further preferably 500 to 1,500, with respect to 100 parts by weight of the synthetic polyisoprene.

Examples of the anionic surfactants to be used in the aforementioned production method (1) include fatty acid salts such as sodium laurate, potassium myristate, sodium palmitate, potassium oleate, sodium linolenate, and sodium rosinate; alkylbenzenesulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinates such as sodium di(2-ethylhexyl) sulfosuccinate, potassium di(2-ethylhexyl) sulfosuccinate, and sodium dioctyl sulfosuccinate; alkyl sulfate ester salts such as sodium lauryl sulfate and potassium lauryl sulfate; polyoxyethylene alkyl ether sulfate ester salts such as sodium polyoxyethylene lauryl ether sulfate and potassium polyoxyethylene lauryl ether sulfate; and monoalkyl phosphates such as sodium lauryl phosphate and potassium lauryl phosphate.

Among these anionic surfactants, fatty acid salts, alkylbenzenesulfonates, alkyl sulfosuccinates, alkyl sulfate ester salts, and polyoxyethylene alkyl ether sulfate ester salts are preferable, and fatty acid salts and alkylbenzenesulfonates are particularly preferable.

Further, use of at least one selected from the group consisting of alkylbenzenesulfonates, alkyl sulfosuccinates, alkyl sulfate ester salts, and polyoxyethylene alkyl ether sulfate ester salts in combination with fatty acid salts is preferable, and use of alkylbenzenesulfonates in combination with fatty acid salts is particularly preferable, because a slight amount of the residual polymerization catalyst (particularly, aluminum and titanium) derived from the synthetic polyisoprene can be more efficiently removed and generation of aggregates is suppressed in the production of the latex composition. Here, as fatty acid salts, sodium rosinate and potassium rosinate are preferable, and as alkylbenzenesulfonates, sodium dodecylbenzenesulfonate and potassium dodecylbenzenesulfonate are preferable. Further, one of these surfactants may be used alone, or two or more of them may be used in combination.

As described above, use of at least one selected from the group consisting of alkylbenzenesulfonates, alkyl sulfosuccinates, alkyl sulfate ester salts, and polyoxyethylene alkyl ether sulfate ester salts in combination with fatty acid salts allows the obtained latex to contain the at least one selected from alkylbenzenesulfonates, alkyl sulfosuccinates, alkyl sulfate ester salts, and polyoxyethylene alkyl ether sulfate ester salts, and fatty acid salts.

Further, in the aforementioned production method (1), surfactants other than the anionic surfactants may be used in combination, and examples of the surfactants other than the anionic surfactants include copolymerizable surfactants such as sulfoesters of a, p-unsaturated carboxylic acids, sulfate esters of $\alpha,\beta$-unsaturated carboxylic acids, sulfoalkyl aryl ethers.

Further, nonionic surfactants such as polyoxyethylene alkyl ethers, polyoxyethylene alkyl phenol ethers, polyoxyethylene alkyl esters, and polyoxyethylene sorbitan alkyl esters may be used in combination, as long as coagulation by the coagulant that is used in dip molding is not inhibited.

The amount of anionic surfactants to be used in the aforementioned production method (1) is preferably 0.1 to 50 parts by weight, more preferably 0.5 to 30 parts by weight, with respect to 100 parts by weight of the synthetic polyisoprene. In the case of using two or more surfactants, the total amount of the surfactants to be used preferably falls within the aforementioned range. That is, for example, in the case of using at least one selected from alkylbenzenesulfonates, alkyl sulfosuccinates, alkyl sulfate ester salts, and polyoxyethylene alkyl ether sulfate ester salts in combination with fatty acid salts, the total amount of these surfactants to be used preferably falls within the aforementioned range. An excessively small amount of the anionic surfactants used may possibly cause a large amount of aggregates in emulsification, or conversely, an excessively large amount thereof facilitates foaming and nay possibly cause pinholes in a molded film such as a dip-molded product to be obtained.

Further, in the case of using at least one selected from alkylbenzenesulfonates, alkyl sulfosuccinates, alkyl sulfate ester salts, and polyoxyethylene alkyl ether sulfate ester salts in combination with fatty acid salts as anionic surfactants, the ratio of these surfactants to be used is preferably adjusted to a range of 1:1 to 10:1, more preferably to a range of 1:1 to 7:1, as a weight ratio of "fatty acid salts": "total of at least one surfactant selected from alkylbenzenesulfonates, alkyl sulfosuccinates, alkyl sulfate ester salts, and polyoxyethylene alkyl ether sulfate ester salts". An excessively large ratio of the at least one surfactant selected from alkylbenzenesulfonates, alkyl sulfosuccinates, alkyl sulfate ester salts, and polyoxyethylene alkyl ether sulfate ester salts to be used may possibly cause intense foaming when handling the synthetic polyisoprene, thereby making operations such as long-term standing and addition of a defoamer necessary, which may possibly lead to a decrease in workability and an increase in cost.

The amount of water to be used in the aforementioned production method (1) is preferably 10 to 1,000 parts by weight, more preferably 30 to 500 parts by weight, most preferably 50 to 100 parts by weight, with respect to 100 parts by weight of the organic solvent solution of the synthetic polyisoprene. Examples of the type of water to be used include hard water, soft water, deionized water, distilled water, zeolite water and the like, and soft water, deionized water, and distilled water are preferable.

As the device that emulsifies the solution or the microsuspension of the synthetic polyisoprene dissolved or finely dispersed in the organic solvent, in water, in the presence of anionic surfactants, devices that are commercially available in general as emulsifying machines or dispersers can be used without specific limitation. The method for adding the anionic surfactants to the solution or the microsuspension of the synthetic polyisoprene is not specifically limited, and the anionic surfactants may be added in advance to either water, or the solution or the microsuspension of the synthetic polyisoprene, or both of them, or may be added in a lump or dividedly to the emulsified liquid during the emulsification operation.

Examples of the emulsifying device include batch emulsifying machines such as the product name "Homogenizer" (manufactured by IKA Works), the product name "POLYTRON" (manufactured by Kinematica AG), and the product name "TK AUTO-HOMO MIXER" (manufactured by Tokushu Kika Kogyo Co., Ltd.); continuous emulsifying machines such as the product name "TK PIPELINE-HOMO MIXER" (manufactured by Tokushu Kika Kogyo Co., Ltd.), the product name "Colloid mill" (manufactured by Shinko Pantec Co., Ltd.), the product name "SLASHER" (manufactured by NIPPON COKE & ENGINEERING CO., LTD.), the product name "Trigonal wet grinder" (manufactured by Mitsui Miike Chemical Engineering Machinery, Co., Ltd.), the product name "CAVTIRON" (manufactured by Eurotec, Ltd.), the product name "MILDER" (manufactured by Pacific Machinery & Engineering Co., Ltd.), and the product name "FINE FLOW MILL" (manufactured by Pacific Machinery & Engineering Co., Ltd.); high-pressure emulsifying machines such as the product name "Microfluidizer" (manufactured by MIZUHO INDUSTRIAL CO., LTD.), the product name "NANOMIZER" (manufactured by NANOMIZER Inc.), and the product name "APV GAULIN" (manufactured by Manton-Gaulin Company); membrane emulsifying machines such as the product name "Membrane emulsifying machine" (manufactured by REICA Co., Ltd.); vibratory emulsifying machines such as the product name "YIBROMIXER" (manufactured by REICA Co., Ltd.); and ultrasonic emulsifying machines such as the product name "Ultrasonic homogenizer" (manufactured by Branson Ultrasonics Corporation). The conditions for the emulsification operation by such emulsifying devices are not specifically limited, and the processing temperature, the processing time, and the like, may be appropriately determined so that a desired dispersion state is achieved.

In the aforementioned production method (1), the organic solvent is desirably removed from the emulsion obtained by the emulsification operation.

As the method for removing the organic solvent from the emulsion, methods that can reduce the content of the organic solvent (preferably, an alicyclic hydrocarbon solvent) in the synthetic polyisoprene latex to be obtained to 500 weight ppm or less are preferable, and methods such as vacuum distillation, normal pressure distillation, water vapor distillation, and centrifugation can be employed, for example.

In the aforementioned method (1), the organic solvent is desirably removed from the emulsion obtained by the aforementioned emulsification operation, to obtain a synthetic polyisoprene latex. The method for removing the organic solvent from the emulsion is not specifically limited as long as it is a method that can reduce the total content of the alicyclic hydrocarbon solvent and the aromatic hydrocarbon solvent as organic solvents in the synthetic polyisoprene latex to be obtained to 500 weight ppm or less, and methods such as vacuum distillation, normal pressure distillation, water vapor distillation, and centrifugation can be employed therefor.

Further, concentration operation may be applied, as needed, by a method such as vacuum distillation, normal pressure distillation, centrifugation, and membrane concentration, after the removal of organic solvents, in order to increase the solid content concentration of the synthetic polyisoprene latex. Centrifugation is particularly preferably performed, since the solid content concentration of the synthetic polyisoprene latex can be increased, and the amount of the surfactants remaining in the synthetic polyisoprene latex can be reduced.

The centrifugation is preferably performed, for example, using a continuous centrifuge, under the conditions in which the centrifugal force is preferably 100 to 10,000 G, the solid content concentration of the synthetic polyisoprene latex before centrifugation is preferably 2 to 15 wt. %, the feed flow rate into the centrifuge is preferably 500 to 1700 Kg/hr, and the back pressure (gauge pressure) of the centrifuge is preferably 0.03 to 1.6 MPa. The synthetic polyisoprene latex can be obtained as a light liquid after the centrifugation. Further, the amount of the surfactants remaining in the synthetic polyisoprene latex can be thereby reduced.

The solid content concentration of the synthetic polyisoprene latex is preferably 30 to 70 wt %, more preferably 40 to 70 wt %. When the solid content concentration is excessively low, the solid content concentration of the latex composition, which will be described below, decreases, and therefore the film thickness of the dip-molded product, which will be described below, decreases, so that the dip-molded product easily breaks. Conversely, when the solid content concentration is excessively high, the viscosity of the synthetic polyisoprene latex increases, so that transfer through a pipe or stirring within a preparation tank may be made difficult in some cases.

The volume average particle size of the synthetic polyisoprene latex is preferably 0.1 to 10 μm preferably 0.5 to 3 μm, further preferably 0.5 to 2.0 μm. Adjusting the volume average particle size to the aforementioned range can make the latex viscosity appropriate to facilitate handling and can suppress formation of a film on the surface of the latex during storage of the synthetic polyisoprene latex.

Further, the synthetic polyisoprene latex may contain additives that are generally contained in the field of latex, such as pH adjusters, defoamers, preservatives, crosslinking agents, chelating agents, oxygen scavengers, dispersants, and anti-aging agents.

Examples of the pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; and organic amine compounds such as trimethylamine and triethanolamine, and alkali metal hydroxides and ammonia are preferable.

Further, as described above, a styrene-isoprene-styrene block copolymer (SIS) can also be used as the conjugated diene polymer. In the SIS, the character "S" represents a styrene block, and the character "I" represents an isoprene block.

The SIS can be obtained by conventionally known methods such as block copolymerization of isoprene and styrene in an inert polymerization solvent using an active organic metal such as n-butyl lithium as an initiator. The polymer solution of the obtained SIS may be used as it is for producing the SIS latex but can be used for producing the SIS latex by extracting a solid SIS from the polymer solution and thereafter dissolving the solid SIS in an organic solvent. As described below, the SIS latex can be used for producing the carboxy-modified conjugated diene polymer latex used in the present invention. The method for producing the SIS latex is not specifically limited, but a method for producing SIS latex by emulsifying, in water, a solution or a microsuspension of a SIS that is dissolved or finely dispersed in an organic solvent in the presence of a surfactant and removing the organic solvent as required is preferable.

At this time, impurities such as the residue of the polymerization catalyst remaining in the polymer solution after the synthesis may be removed. Further, an anti-aging agent, which will be described below, may be added into the solution during the polymerization or after the polymerization. Further, a commercially available solid SIS also can be used.

As the organic solvent, the same organic solvent as that for the aforementioned synthetic polyisoprene can be used, and aromatic hydrocarbon solvents and alicyclic hydrocarbon solvents are preferable, and cyclohexane and toluene are particularly preferable.

The amount of the organic solvent to be used is generally 50 to 2,000, preferably 80 to 1,000 parts by weight, more preferably 10 to 500 ports by weight, further preferably 150 to 300 parts by weight, with respect to 100 parts by weight of the SIS.

As the surfactants, the same surfactants as described above for the aforementioned synthetic polyisoprene can be mentioned, for example. Anionic surfactants are suitable, and sodium rosinate, and sodium dodecylbenzene sulfonate are particularly preferable.

The amount of surfactants to be used is preferably 0.1 to 50 parts by weight, more preferably 0.5 to 30 parts by weight, with respect to 100 parts by weight of the SIS. When this amount is excessively small, the stability of the latex tends to be poor. Conversely, when the amount is excessively large, foaming easily occurs, which may possibly cause a problem in dip molding.

The amount of water to be used in the aforementioned method parts for producing the SIS latex is preferably 10 to 1,000 parts by weight, more preferably 30 to 500 parts weight, most preferably 50 to 100 parts by weight, with respect to 100 parts by weight of the organic solvent solution of the SIS. Examples of the type of water to be used include hard water, soft water, deionized water, distilled water, and zeolite water and the like. Further, polar solvents typified by alcohols such as methanol may be used in combination with water.

As a method for adding monomers, the same methods as described above for the aforementioned synthetic polyisoprene can be mentioned, for example. As a device that emulsifies an organic solvent solution or a microsuspension of SIS in water in the presence of a surfactant, the same devices as described above for the aforementioned synthetic polyisoprene can be mentioned, for example. The method for adding the surfactants is not specifically limited, and the surfactants may be added in advance to either water, or the organic solvent solution or the microsuspension of the SIS, or both of them, or may be added to the emulsified liquid during the emulsification operation at one time or several times.

In the aforementioned method for producing a SIS latex, the SIS latex is preferably obtained by removing the organic solvent from the emulsion obtained by the emulsification operation. The method for removing the organic solvent from the emulsion is not specifically limited, and methods such as vacuum distillation, normal pressure distillation, water vapor distillation, and centrifugation can be employed.

Further, in order to increase the solid content concentration of the SIS latex, concentration operation may be applied after the removal of the organic solvent, as needed, by methods such as vacuum distillation, normal pressure distillation, centrifugation, and membrane concentration.

The solid content concentration of the SIS latex is preferably 30 to 70 wt %, more preferably 50 to 70 wt %. When the solid content concentration is excessively low, the solid content concentration of the latex composition, which will be described below, decreases, and therefore the film thickness of the dip-molded product decreases, so that the dip-molded product easily breaks. Conversely, when the solid content concentration is excessively high, the viscosity of the SIS latex increases, so that transfer through a pipe or stirring within a preparation tank is made difficult.

Further, the SIS latex may contain additives that are generally contained in the field of latex, such as pH adjusters, defoamers, preservatives, crosslinking agents, chelating agents, oxygen scavengers, dispersants, and anti-aging agents. As the pH adjusters, the same pH adjusters as described above for the synthetic polyisoprene can be mentioned, and alkali metal hydroxides and ammonia are preferable.

The content of styrene units in the styrene block of the SIS contained in the thus obtained SIS latex is preferably 70 to 100 wt %, more preferably 90 to 100 wt %, further preferably 100 wt %, with respect to all monomer units.

Further, the content of isoprene units in the isoprene block of the SIS is preferably 70 to 100 wt %, more preferably 90 to 100 wt %, further preferably 100 wt %, with respect to all monomer units.

The content ratio of the styrene units to isoprene units in the SIS is generally in the range of 1:99 to 90:10, preferably 3:97 to 70:30, more preferably 5:95 to 50:50, further preferably 10:90 to 30:70, as a weight ratio of "styrene units: isoprene units".

The weight-average molecular weight of the SIS is preferably 10,000 to 1,000,000, more preferably 50,000 to 500,000, further preferably 100,000 to 300,000, in terms of standard polystyrene by gel permeation chromatography. Adjusting the weight-average molecular weight of the SIS to the aforementioned range tends to improve the balance of the tensile strength and the flexibility of the molded film such rig a dip-molded product and facilitate the production of the SIS latex.

The volume average particle size of the latex particles (SIS particles) in the SIS latex is preferably 0.1 to 10 μm, more preferably 0.5 to 3 μm, further preferably 0.5 to 2.0 μm. Adjusting the volume average particle size of the latex particles to the aforementioned range makes the latex viscosity appropriate to facilitate handling and can suppress formation of a film on the surface of the latex during storage of the SIS latex.

Further, natural rubber can also be used as the conjugated diene polymer. Natural rubber contained in latex obtained from a natural rubber tree and natural rubber contained in latex formed by treating the aforementioned latex can be used therefor. For example, natural rubber contained in field latex collected from a natural rubber tree, natural rubber contained in commercially available natural rubber latex formed by treating field latex with ammonia, etc., and the like, can be used therefor.

Further, a nitrile group-containing conjugated diene copolymer can also be used as the conjugated diene polymer, as described above.

The nitrile group-containing conjugated diene gene copolymer is a copolymer formed by copolymerization of ethylenically unsaturated nitrile monomers with conjugated diene monomers and may be a copolymer formed by copolymerization of the aforementioned monomers with other ethylenically unsaturated monomers that are copolymerizable with the aforementioned monomers and are used, as required, in addition to the aforementioned monomers.

Examples of the conjugated diene monomers include 1,3-butadiene, isoprene, 2,3-dimethyl-1,3-butadiene, 2-ethyl-1,3-butadiene, 1,3-pentadiene, chloroprene, and the like. Among these, 1,3-butadiene and isoprene are preferable, and 1,3-butadiene is more preferable. One of these conjugated diene monomers can be used alone, or two or more of them can be used in combination. The content proportion of conjugated diene monomer units formed by the conjugated diene monomers in the nitrile group containing conjugated diene copolymers is preferably 56 to 78 wt %, more preferably 56 to 73 wt %, further preferably 56 to 68 wt %. Adjusting the content of conjugated diene monomer units to the aforementioned range can allow a molded film such as a dip-molded product to be obtained to be more excellent in texture and elongation, while having sufficient tensile strength.

The ethylenically unsaturated nitrile monomers are not specifically limited as long as they are ethylenically unsaturated monomers containing a nitrile group, tut examples thereof include acrylonitrile, methacrylonitrile, fumaronitrile, α-chloroacrylonitrile, α-cyanoethylacrylonitrile, and the like. Among these, acrylonitrile and methacrylonitrile are preferable, and acrylonitrile is more preferable. One of these ethylenically unsaturated nitrile monomers can be used alone, or two or more of them can be used in combination. The content proportion of ethylenically unsaturated nitrile monomer units formed by the ethylenically unsaturated nitrile monomers in the nitrile group-containing conjugated diene copolymer is preferably 20 to 40 wt %, more preferably 25 to 40 wt %, further preferably 30 to 40 wt %. Adjusting the content of the ethylenically unsaturated nitrile monomer units to the aforementioned range can allow a molded film such as a dip-molded product to be obtained to be more excellent in texture and elongation, while having sufficient tensile strength.

Examples of the other ethylenically unsaturated monomers that are copolymerizable with the conjugated diene monomers and the ethylenically unsaturated nitrile monomers include ethylenically unsaturated carboxylic acid monomers that are ethylenically unsaturated monomers containing a carboxyl group; vinyl aromatic monomers such as styrene, alkyl styrene, and vinyl naphthalene; fluoroalkyl vinyl ethers such as fluoroethyl vinyl ether; ethylenically unsaturated amide monomers such as (meth)acrylamide, N-methylol (meth) acrylamide, N,N-dimethylol (meth) acrylamide, N-methoxymethyl (meth)acrylamide, and N-propoxymethyl (meth)acrylamide; ethylenically unsaturated carboxylic acid ester monomers such as methyl (meth) acrylate, ethyl (meth) acrylate, butyl (meth) acrylate, 2-ethylhexyl (meth) acrylate, trifluoroethyl (meth) acrylate, tetrafluoropropyl (meth) acrylate, dibutyl maleate, dibutyl fumarate, diethyl maleate, methoxymethyl (meth) acrylate, ethoxyethyl (meth) acrylate, methoxyethoxyethyl (meth) acrylate, cyan ethyl (meth)acrylate, 2-cyanoethyl (meth) acrylate, 1-cyanopropyl (meth) acrylate, 2-ethyl-6-cyanohexyl (meth)acrylate, 3-cyanopropyl (meth) acrylate, hydroxyethyl (meth) acrylate, hydroxypropyl (meth) acrylate, glycidyl (meth) acrylate, and dimethylaminoethyl (meth) acrylate; crosslinkable monomers such as divinylbenzene, polyethylene glycol di (meth) acrylate, polypropylene glycol di(meth)acrylate, trimethylolpropane tri (meth)acrylate, and pentaerythritol (meth)acrylate; and the like. One of these ethylenically unsaturated monomers can be used alone, or two or more of them can be used in combination.

The ethylenically unsaturated carboxylic acid monomers are not specifically limited as long as they are ethylenically unsaturated monomers containing a carboxyl group, but examples thereof include ethylenically unsaturated monocarboxylic acid monomers such as acrylic acid and methacrylic ethylenically unsaturated polyvalent carboxylic acid monomers such as itaconic acid, maleic acid, and fumaric acid; ethylenically unsaturated polyvalent carboxylic acid anhydrides such as maleic anhydride and citraconic anhydride; ethylenically unsaturated polyvalent carboxylic acid partial ester monomers such as monobutyl fumarate, monobutyl maleate, and mono-2-hydroxypropyl maleate; and the like. Among these, ethylenically unsaturated monocarboxylic acid is preferable, and methacrylic acid is particularly preferable. The ethylenically unsaturated carboxylic acid monomers are used as alkali metal salts or ammonium salts. Further, one of these ethylenically unsaturated carboxylic acid monomers can be used alone, or two or more of them can be used in combination. The content proportion of ethylenically unsaturated carboxylic acid monomer units formed by the ethylenically unsaturated carboxylic acid monomers in the nitrile group-containing conjugated diene copolymer is preferably 2 to 5 wt %, more preferably 2 to 4.5 wt %, further preferably 2.5 to 4.5 wt %. Adjusting the content of the ethylenically unsaturated carboxylic acid monomer units to the aforementioned range can allow a molded film such as a dip-molded product to be obtained to be more excellent in texture and elongation, while having sufficient tensile strength.

The content proportion of other monomer units formed by the other ethylenically unsaturated monomers in the nitrile group-containing conjugated diene copolymer is preferably 10 wt % or less, more preferably 5 wt % or less, further preferably 3 wt % or less.

The nitrile group-containing conjugated diene copolymer is obtained by copolymerization of a monomer mixture containing the aforementioned monomers, but a method of copolymerization by emulsion polymerization is preferable. For the emulsion polymerization method, a conventionally known method can be employed.

In the emulsion polymerization of the monomer mixture containing the aforementioned monomers, polymerization auxiliary materials that are generally used such as emulsifiers, polymerization initiators, and molecular weight modifiers can be used. A method for adding these polymerization auxiliary materials is not specifically limited, and any method such as initial one-time addition, divided addition, and continuous addition may be employed.

The emulsifiers are not specifically limited, and examples thereof can include nonionic emulsifiers such as polyoxyethylene alkyl ether, polyoxyethylene alkyl phenol ether, polyoxyethylene alkyl ester, and polyoxyethylene sorbitan alkyl ester; anionic emulsifiers such as alkylbenzene sulfonates including potassium dodecylbenzene sulfonate, sodium dodecylbenzene sulfonate, and the like, higher alcohol sulfate salts, and alkyl sulfosuccinates; cationic emulsifiers such as alkyl trimethyl ammonium chloride, dialkyl ammonium chloride, and benzyl ammonium chloride; copolymerizable emulsifiers such as sulfoesters of α,β-unsaturated carboxylic acids, sulfate esters of α,β-unsaturated carboxylic acids, and sulfoalkyl aryl ethers; and the like. Among these, anionic emulsifiers are preferable, alkylbenzene sulfonates are more preferable, and potassium dodecylbenzene sulfonate and sodium dodecylbenzene sulfonate are particularly preferable. One of these emulsifiers can be used alone, or two or more of them can be used in combination. The amount of the emulsifiers to be used is preferably 0.1 to 10 parts by weight with respect to 100 parts by weight of the monomer mixture.

The polymerization initiators are not specifically limited, but examples thereof can include inorganic peroxides such as sodium persulfate, potassium persulfate, ammonium persulfate, potassium superphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyryl peroxide, and benzoyl peroxide; azo compounds such as azobisisobutyronitrile, azobis-2,4-dimethylvaleronitrile, and methyl azobisisobutyrate; and the like. One of these polymerization initiators can be used alone, or two or more of them can be used in combination. The amount of the polymerization initiators to be used is preferably 0.01 to 10 parts by weight, more preferably 0.01 to 2 parts by weight, with respect to 100 parts by weight of the monomer mixture.

Further, peroxides initiators can be used in combination with reductants as redox polymerization initiators. The reductants are not specifically limited, but examples thereof include compounds containing reduced metal ions such as ferrous sulfate and cuprous naphthenate; sulfonic acid compounds such as sodium methanesulfonate; amine compounds such as dimethyl aniline; and the like. One of these reductants can be used alone, or two or more of them can be used in combination. The amount of the reductants to be used is preferably 3 to 1000 parts by weight with respect to 100 parts by weight of peroxides.

The amount of water to be used in the emulsion polymerization is preferably 80 to 600 parts by weight, particularly preferably 100 to 200 parts by weight, with respect to 100 parts by weight of all monomers to be used.

As a method for adding monomers, a method of adding monomers to be used into a reaction container in a lump, a method of adding monomers continuously or intermittently as polymerization proceeds, a method of partially adding monomers to allow reaction to proceed to a specific conversion rate and then adding the residual monomers continuously or intermittently for polymerization, and the like can be mentioned, for example. Any one of the methods may be employed. In the case of mixing monomers and thereafter adding the monomers continuously or intermittently, the position of the mixture may be constant or varied. Further, as the monomers, various monomers to be used may be mixed in advance and then added into the reaction container or may be separately added into the reaction container.

Further, polymerization auxiliary materials such as chelating agents, dispersants, pH adjusters, oxygen scavengers, and particle size modifiers can be used, as required, and both the type and the amount of these polymerization auxiliary materials to be used are not specifically limited.

The polymerization temperature during the emulsion polymerization is not specifically limited but is generally 3 to 95° C., preferably 5 to 60° C. The polymerization time is about 5 to 40 hours.

The monomer mixture is subjected to emulsion polymerization as described above, and the polymerization reaction is stepped by cooling the polymerization system or adding a polymerization terminator at the time when a predetermined polymerization conversion rate is reached. The polymerization conversion rate at which the polymerization reaction is stopped is preferably 90 wt % or more, more preferably 93 wt % or more.

The polymerization terminator is not specifically limited, bit examples thereof include hydroxylamine, hydroxyamine sulfate, diethylhydroxylamine, hydroxyaminesulfonic acid and alkali metal salts thereof, sodium dimethyldithiocarbamate, hydroquinone derivatives, catechol derivatives, and aromatic hydroxydithiocarboxylic acids such as hydroxydimethylbenzenethiocarboxylic acid, hydroxydiethylbenzenedithiocarboxylic acid, and hydroxydibutylbenzenedithiocarboxylic acid, and alkali metal salts thereof, and the like. The amount of the polymerization terminator to be used is preferably 0.05 to 2 parts by weight with respect to 100 parts by weight of the monomer mixture.

After the polymerization reaction is stepped, unreacted monomers are removed, as needed, and the solid content concentration and the pH are adjusted, so that the latex of the nitrile group-containing conjugated diene copolymer can be obtained.

Further, anti-aging agents, preservatives, antibacterial agents, dispersants, and the like may be appropriately added to the latex of the nitrile group-containing conjugated diene copolymer, as required.

The number-average particle size of the latex of the nitrile group-containing conjugated diene copolymer is preferably 60 to 300 nm, more preferably 80 to 150 nm. The particle size can be adjusted to a desired value by a method of regulating the amount of the emulsifiers and polymerization initiators to be used, and the like.

As described above, a synthetic polyisoprene, a styrene-isoprene-styrene block copolymer (SIS), a nitrile group-containing conjugated diene copolymer, and the like can be used as the carboxy-modified conjugated diene polymer used in the present invention, but there is no limitation to these examples, and a butadiene polymer, a styrene-butadiene copolymer, and the like may be used.

The butadiene polymer may be a homopolymer of 1,3-butadiene as conjugated diene monomers or may be a copolymer formed by copolymerization of 1,3-butadiene as conjugated diene monomers with other ethylenically unsaturated monomers that are copolymerizable with 1,3-butadiene.

Further, the styrene-butadiene copolymer may be a copolymer formed by copolymerization of 1,3-butadiene as conjugated diene monomers with styrene or may be a copolymer formed by copolymerization of the aforementioned monomers with other ethylenically unsaturated monomers that are copolymerizable with the aforementioned monomers and are used, as required, in addition to the aforementioned monomers.

Carboxy-Modified Conjugated Diene Polymer Latex

The carboxy-modified conjugated diene polymer constituting the carboxy-modified conjugated diene polymer latex used in the present invention can be obtained by modifying the aforementioned conjugated diene polymer with a monomer having a carboxyl group. However, in the case where the carboxy-modified conjugated diene polymer is a copolymer obtained by copolymerization of the aforementioned ethylenically unsaturated carboxylic acid, the modification of the conjugated diene polymer with a monomer having a carboxyl group is not necessarily required.

According to the present invention, the modification of the conjugated diene polymer with a monomer having a carboxyl group can suppress the occurrence of aggregates in a latex composition using the carboxy-modified conjugated diene polymer latex to be obtained and thereby can reduce, in the case of producing a molded film such as a dip-molded product using the latex composition, the failure rate of the molded film. Further, the modification of the conjugated diene polymer with a monomer having a carboxyl group can improve the tensile strength of a latex composition using the carboxy-modified conjugated diene polymer latex to be obtained when formed into a molded film such as a dip-molded product.

The method for modifying the conjugated diene polymer with a monomer having a carboxyl group is not specifically limited, but examples thereof include a method of graft-polymerizing a conjugated diene polymer with a monomer having a carboxyl group in the water phase. The method of graft-polymerizing a conjugated diene polymer with a monomer having a carboxyl group in the water phase is not specifically limited, and a conventionally known method may be used, but a method of adding a monomer having a carboxyl group and an organic peroxide to a conjugated diene polymer latex and thereafter reacting the conjugated diene polymer with the monomer having a carboxyl group in the water phase is preferable, for example.

The organic peroxide is not specifically limited, but examples thereof include diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, benzoyl peroxide, and the like. For improving the mechanical strength of the dip-molded product to be obtained, 1,1,3,3-tetramethylbutyl hydroperoxide is particularly preferable. One of these organic peroxides may be used alone, or two or more of them may be used in combination.

The amount of the organic peroxide to be added is not specifically limited but is preferably 0.01 to 3 parts by weight, more preferably 0.1 to 1 part by weight, with respect to 100 parts by weight of the conjugated diene polymer contained in the conjugated diene polymer latex.

Further, the organic peroxide can be used as a redox polymerization initiator in combination with a reductant. The reductant is not specifically limited, but examples thereof include compounds containing reduced metal ions such as ferrous sulfate and cuprous naphthenate; sulfinates such as sodium hydroxymethanesulfinate; amine compounds such as dimethyl aniline, and the like. One of these reductants may be used alone, or two or more of them may be used in combination.

The amount of the reductant to be added is not specifically limited but is preferably 0.01 to 1 part by weight with respect to 1 part by weight of the organic peroxide.

The methods for adding the organic peroxide and the reductant are not specifically limited, and known addition methods such as one-time addition, divided addition, and continuous addition can be used.

The reaction temperature when reacting the conjugated diene polymer with the monomer having a carboxyl group is not specifically limited but is preferably 15 to 80° C., more preferably 30 to 50° C. The reaction time when reacting the conjugated diene polymer with the monomer having a carboxyl group may be appropriately set corresponding to the aforementioned reaction temperature but is preferably 30 to 300 minutes, more preferably 60 to 120 minutes.

The solid content concentration of the conjugated diene polymer latex when reacting the conjugated diene polymer with the monomer having a carboxyl group is not specifically limited but is preferably 5 to 60 wt %, more preferably 10 to 40 wt %.

Examples of the monomer having a carboxyl group can include an ethylenically unsaturated monocarboxylic acid monomer such as acrylic a id and methacrylic acid; an ethylenically unsaturated polyvalent carboxylic acid monomer such as itaconic acid, maleic acid, fumaric acid, and butene tricarboxylic acid; a partial ester monomer of an ethylenically unsaturated polyvalent carboxylic acid such as monobutyl fumarate, monobutyl maleate, and mono-2-hydroxypropyl maleate; a polyvalent carboxylic acid an such as maleic anhydride and citraconic anhydride, and the like. An ethylenically unsaturated monocarboxylic acid monomer is preferable, and acrylic acid and methacrylic acid are particularly preferable, for achieving further remarkable effects of the present invention. One of these monomers may be used alone, or two or more of them may be used in combination.

Further, the aforementioned carboxyl group includes those in the form of salts with alkali metals, ammonia, and the like.

The amount of the monomer having a carboxyl group to be used is preferably 0.01 part by weight to 100 parts by weight, more preferably 0.01 part by weight to 40 parts by weight, further preferably 0.5 part by weight to 20 parts by weight, with respect to 100 parts by weight of the conjugated diene polymer. Adjusting the amount of the monomer having a carboxyl group to be used to the aforementioned ranges makes the viscosity of the latex composition to be obtained more appropriate, thereby facilitating transfer and further improving the tensile strength of the molded film such as a dip-molded product to be formed using the latex composition to be obtained.

The method for adding the monomer having a carboxyl group to the conjugated diene polymer latex is not specifically limited, and known addition methods such as one-time addition, divided addition, and continuous addition can be employed.

The modification rate of the carboxy-modified conjugated diene polymer with the monomer having a carboxyl group may be appropriately controlled corresponding to the intended use of the latex composition to be obtained but is preferably 0.01 to 10%, more preferably 0.5 to 5%. The modification rate is represented by formula (i) below.

Modification rate (mol %)=$(X/Y) \times 100$     (i)

In formula (i) above, X represents the lumber of carboxyl groups in the carboxy-modified conjugated diene polymer, and Y represents the total number of monomer units in the carboxy-modified conjugated diene polymer, respectively. X can be determined by examining the carboxy-modified conjugated diene polymer by $^1$H-NMR. Further, Y can be determined by calculating the value of (weight-average molecular weight (Mw) of carboxy-modified conjugated diene polymer)/(average molecular weight corresponding to content of each monomer unit constituting carboxy-modified conjugated diene polymer).

The polymerization catalyst (graft polymerization catalyst) used for the graft polymerization is not specifically limited, but examples thereof can include inorganic peroxides such as sodium persulfate, potassium persulfate, ammonium persulfate, potassium superphosphate, and hydrogen peroxide; organic peroxides such as diisopropyl benzene hydroperoxide, cumene hydroperoxide, t-butyl hydroperoxide, 1,1,3,3-tetramethylbutyl hydroperoxide, di-t-butyl peroxide, isobutyryl peroxide, and benzoyl peroxide; azo compounds such as 2,2'-azobisisobutyronitrile, azobis-2,4-dimethylvaleronitrile, and methyl azobisisobutyrate, and the like. For further improving the tensile strength of the molded film such as a dip-molded product to be obtained, organic peroxides are preferable, and 1,1,3,3-tetramethylbutyl hydroperoxide is particularly preferable.

One of the aforementioned graft polymerization catalysts can be used alone, or two or more of them can be used in combination. The amount of the graft polymerization catalyst to be used differs depending on the type but is preferably 0.1 to 10 parts by weight, more preferably 0.2 to 5 parts by weight, with respect to 100 parts by weight of the conjugated diene polymer. Further, the method for adding the graft polymerization catalyst is not specifically limited, and known addition methods such as one-time addition, divided addition, and continuous addition can be employed.

The conversion rate of the graft polymerization is preferably 95 wt % or more, more preferably 97 wt % or more. Adjusting the conversion rate of the graft polymerization to the aforementioned ranges further improves the tensile strength of the molded film such as a dip-molded product to be obtained.

The carboxy-modified conjugated diene polymer latex used in the present invention may contain additives that are generally mixed in the field of latexes, such as pH adjusters, defoamers, preservatives, chelating agents, oxygen scavengers, dispersants, and anti-aging agents.

Examples of the pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine, and the like. Alkali metal hydroxides and ammonia are preferable.

Further, in order to increase the solid content concentration of the carboxy-modified conjugated diene polymer latex, concentration operation may be applied, as needed, by methods such as vacuum distillation, normal pressure distillation, centrifugation, and membrane concentration, after the graft polymerization. Centrifugation is preferably performed, since the amount of the anionic surfactant remaining in the carboxy-modified conjugated diene polymer latex can be adjusted.

In the case where the carboxy-modified conjugated diene polymer latex after the graft polymerization is treated in a centrifuge, the pH of the latex is preferably adjusted by adding a pH adjuster in advance to 7 or more, more preferably to 9 or more, for improving the mechanical stability of the latex. When the pH of the latex is adjusted, the carboxyl group introduced by modification may be in the form of salts.

The solid content concentration of the cat -modified synthetic isoprene polymer latex of the present invention is preferably 30 to 70 wt %, more preferably 40 to 70 wt %. Adjusting the solid content concentration to the aforementioned ranges can suppress the occurrence of aggregates in the latex more effectively and can suppress separation of polymer particles during storage of the latex more effectively.

Farther, the content of the monomer unit having a carboxyl grasp in the carboxy-modified synthetic isoprene polymer is preferably 0.01 to 50 wt %, more preferably 0.5 to 40 wt %, further preferably 1 to 30 wt %, particularly preferably 1 to 15 wt.%, with respect to all monomer units. Adjusting the content of the monomer unit having a carboxyl group to the aforementioned ranges further improves the mechanical stability of the latex composition to be obtained and further improves the flexibility and the tensile strength of the dip-molded product to be formed using the latex composition to be obtained. In the present invention, the content of the monomer unit having a carboxyl group includes not only the content of the monomer unit having a carboxyl group introduced by copolymerization of the monomer having a carboxyl group with isoprene but also the content of the monomer having a carboxyl group constituting the graft chain introduced into the conjugated diene polymer chain by the graft polymerization.

Xanthogen Compound

The latex composition of the present invention contains a xanthogen compound in addition to the aforementioned carboxy-modified conjugated diene polymer latex.

The xanthogen compound used in the present invention can act as a vulcanization accelerator then used in combination with a sulfur vulcanizing agent. That is, in the case where the latex composition is mixed with a sulfur vulcanizing agent, and the carboxy-modified conjugated diene polymer in the later composition is vulcanized by the sulfur vulcanizing agent, to form a molded film such as a dip-molded product, the xanthogen compound act as a vulcanization accelerator. Further, the xanthogen compound acts as a vulcanization accelerator on the latex composition mixed with the sulfur vulcanizing agent and is decomposed into alcohol, carbon disulfide, and the like, after the vulcanization, due to the heat applied during the vulcanization. For example, the xanthogen compound is decomposed into alcohol, carbon disulfide, and the like, due to the heat applied when producing the molded film (heat at about 100 to 130° C. in the vulcanization of the carboxy-modified conjugated diene polymer), to volatilize the components (such as alcohol and carbon disulfide) generated by the decomposition. This can reduce the amount of the xanthogen compound that remains in the molded film to be obtained. The present invention uses the xanthogen compound as a vulcanization accelerator, without using vulcanization accelerators (such as dithiocarbamate vulcanization accelerators, thiazole vulcanization accelerators, and the like) which have conventionally caused the onset of symptoms of delayed allergy (Type IV), thereby enabling a reduction in the amount of the xanthogen compound remaining in the molded film such as a dip-molded product to be obtained and therefore enabling suppression of the onset of symptoms of delayed allergy (Type IV) caused by the molded film to be obtained. Moreover, in the latex composition of the present invention, the carboxy-modified conjugated diene polymer that is a synthetic rubber, instead of a natural rubber, is used, and therefore the onset of symptoms of immediate allergy (Type I) in the molded film to be obtained caused by proteins contained in natural rubber can also be suppressed.

The xanthogen compound used in the present invention is not specifically limited, but examples thereof include a xanthic acid, a xanthate, a xanthogen disulfide (a compound with two xanthic acids bound via sulfur atom or the like), a xanthogen polysulfide (a compound with three or more xanthic acids bound via Sulfur atom or the like), and the like.

The xanthate is not specifically limited, as long as it has a xanthate structure, but examples thereof include a compound represented by formula (ROC(=S)S)x-Z (where R represents a linear or branched hydrocarbon, Z represents a metal atom, and x represents a numerical value that matches the valence of Z and is generally 1 to 4, preferably 2 to 4, particularly preferably 2).

The xanthate represented by the formula (ROC(=S)S)x-Z above is not specifically limited, but examples thereof include zinc dimethyl xanthate, zinc diethyl xanthate, zinc dipropyl xanthate, zinc diisopropyl xanthate, zinc dibutyl xanthate, zinc dipentyl xanthate, zinc dihexyl xanthate, zinc diheptyl xanthate, zinc dioctyl xanthate, zinc di(2-ethylhexyl) xanthate, zinc didecyl xanthate, zinc didodecyl xanthate, potassium dimethyl xanthate, potassium ethyl xanthate, potassium propyl xanthate, potassium isopropyl xanthate, potassium butyl xanthate, potassium pentyl xanthate, potassium hexyl xanthate, potassium heptyl xanthate, potassium octyl xanthate, potassium 2-ethylhexyl xanthate, potassium decyl xanthate, potassium dodecyl xanthate, sodium methyl xanthate, serum ethyl xanthate, sodium propyl xanthate, sodium isopropyl xanthate, sodium butyl xanthate, sodium pentyl xanthate, sodium hexyl xanthate, sodium heptyl xanthate, sodium octyl xanthate, sodium 2-ethylhexyl xanthate, sodium decyl xanthate, sodium dodecyl xanthate, and the like. Among these, isopropyl xanthates and butyl xanthates may be employed. The xanthate with x in the formula (ROC(=S)S)x-Z above being 2 or more is preferable, diisopropyl xanthates and dibutyl xanthates are more preferable, and zinc diisopropyl xanthate and zinc dibutyl xanthate are particularly preferable. One of these xanthates may be used alone, or two or more of them may be used in combination.

The xanthogen disulfide is a compound with two xanthic acids bound via sulfur atom or the like and is not specifically limited, but examples thereof include dimethyl xanthogen disulfide, diethyl xanthogen disulfide, diisopropyl xanthogen disulfide, dibutyl xanthogen disulfide, dimethyl xanthogen polysulfide, xanthogen polysulfide, diisopropyl xanthogen polysulfide, dibutyl xanthogen polysulfide, and the like. Among these, diisopropyl xanthogen disulfide and dibutyl xanthogen disulfide are preferable.

The xanthogen polysulfide is a compound with three or more xanthic acids bound via sulfur atom or the like, and examples thereof include a xanthogen trisulfide with three xanthic acids bound via sulfur, a xanthogen tetrasulfide with fair xanthic acids bound via sulfur, a xanthogen pentasulfide with five xanthic acids bound via sulfur, and the like.

In the latex composition of the present invention, one of these xanthogen compounds may be contained alone, or two or more of them may be contained. For example, in the case where a xanthic acid is mixed with the latex composition, two or more xanthogen compounds may be contained in the latex composition, because the xanthic acid mixed is partially present in the form of a xanthate due to the action of the metal oxide present in the latex composition. Alternatively, in the case where sulfur is contained in the latex composition as a sulfur vulcanizing agent or the like, the xanthic acid mixed in the latex composition may be present in the form of a xanthogen disulfide or a xanthogen polysulfide due to the action of sulfur. Likewise, also in the case where a xanthate, a xanthogen disulfide, or a xanthogen polysulfide is mixed with the latex composition, these may be each present in the form of any one of a xanthic acid, a xanthate, a xanthogen disulfide, and a xanthogen polysulfide.

The content of the xanthogen compound (in the case where a plurality of xanthogen compounds are contained in the latex composition, the total content thereof) in the latex composition of the present invention is preferably 0.01 to 10 parts by weight, more preferably 0.1 to 7 parts by weight, further preferably 0.5 to 5 parts by weight, with respect to 100 parts by weight of the carboxy-modified conjugated diene polymer contained in the latex. Adjusting the content of the xanthogen compound to the aforementioned ranges can further improve the tensile strength, while suppressing the onset of symptoms of delayed allergy (Type IV) in the molded film such as a dip-molded product to be obtained.

In the present invention, the latex composition is preferably substantially free from compounds that are conventionally used as vulcanization accelerators, specifically, vulcanization accelerators containing sulfur which canes the onset of symptoms of delayed allergy (Type IV) (such as dithiocarbamate vulcanization accelerators and thiazole vulcanization accelerators) and remain in the molded film such as a dip-molded product to be obtained after they act as vulcanization accelerators, except for the xanthogen compound.

In the latex composition of the present invention, the method for mixing the xanthogen compound is not specifically limited, as long as the method eventually allows the carboxy-modified conjugated diene polymer latex to be mixed with the xanthogen compound, but examples thereof include a method of obtaining the aforementioned carboxy-modified conjugated diene polymer latex and thereafter mixing a xanthogen compound with the carboxy-modified conjugated diene polymer latex, a method of mixing a xanthogen compound with a solution or a fine suspension of the carboxy-modified conjugated diene polymer dissolved or finely dispersed in an organic solvent in advance, thereafter emulsifying the solution or fine suspension of the carboxy/modified conjugated diene polymer mixed with the xanthogen compound in water, and removing the organic solvent as required, to obtain the carboxy-modified conjugated diene polymer latex mixed with the xanthogen compound, and the like. Among these, a method of obtaining the carboxy-modified conjugated diene polymer latex and thereafter mixing a xanthogen compound with the carboxy-modified conjugated diene polymer latex is preferable, since the xanthogen compound is easily dissolved, and the xanthogen compound is mixed more easily.

Metal Oxide

The latex composition of the present invention contains a metal oxide In addition to the carboxy-modified conjugated diene polymer latex and the xanthogen compound described above.

According to the present invention, a metal oxide is mixed with the latex composition, and therefore the metal oxide acts as a vulcanization accelerator together with the aforementioned xanthogen compound, and the metal oxide itself acts as a crosslinking agent to crosslink carboxyl groups of the carboxy-modified conjugated diene polymer, when a molded film such as a dip-molded product is formed using the latex composition to be obtained by vulcanizing the carboxy-modified conjugated diene polymer in the latex composition with the sulfur vulcanizing agent, thereby further improving the tensile strength of the molded film such as a dip-molded product to be obtained.

The metal oxide is not specifically limited, but examples thereof include zinc oxide, magnesium oxide, titanium oxide, calcium oxide, lead oxide, iron oxide, copper oxide, tin oxide, nickel oxide, chromium oxide, cobalt oxide, aluminum oxide, and the like. Among these, zinc oxide is preferable, for further improving the tensile strength of the molded film such as a dip-molded product to be obtained. One of these metal oxides can be used alone, or two or more of them can be used in combination.

The content of the metal oxide in the latex composition of the present invention is preferably 0.01 to 30 parts by weight, more preferably 0.1 to 20 parts by weight, further preferably 0.5 to 15 parts by weight, with respect to 100 parts by weight of the carboxy-modified conjugated diene polymer contained in the latex. Adjusting the content of the metal oxide to the aforementioned ranges can further improve the tensile strength of the molded film such as a dip-molded product to be obtained.

In the latex composition of the present invention, the method for mixing the metal oxide is not specifically limited, as long as the method eventually allows the carboxy-modified conjugated diene polymer latex to be mixed with the metal oxide, but examples thereof include a method of obtaining a carboxy-modified conjugated diene polymer latex and thereafter mixing the metal oxide with the carboxy-modified conjugated diene polymer latex, and the like.

Latex Composition

The latex composition of the present invention contains a carboxy-modified conjugated diene polymer latex, a xanthogen compound, and a metal oxide, as described above.

The latex composition of the present invention needs only to contain a carboxy-modified conjugated diene polymer latex, a xanthogen compound, and a metal oxide but preferably further contains a sulfur vulcanizing agent.

Examples of the sulfur vulcanizing agent include a sulfur such as powder sulfur, flowers of sulfur, precipitated sulfur, colloid sulfur, surface-treated sulfur, and insoluble sulfur; and a sulfur-containing compound such as sulfur chloride, sulfur dichloride, morpholine disulfide, alkyl phenol disulfide, caprolactam disulfide (N,N'-dithio-bis (hexahydro-2H-azepinone-2)), phosphorus-containing polysulfides, polymer polysulfides, and 2-(4'-morpholinodithio) benzothiazole. Among these, the sulfur can be preferably used. One of the crosslinking agents may be used alone, or two or more of than may be used in combination.

The content of the sulfur vulcanizing agent is not specifically limited but is preferably 0.1 to 10 parts by weight, more preferably 0.2 to 3 parts by weight, with respect to 100 parts by weight of the carboxy-modified conjugated diene polymer. Adjusting the content of the sulfur vulcanizing agent to the aforementioned ranges can further enhance the tensile strength, while suppressing the onset of symptoms of delayed allergy (Type IV) in the molded film such as a dip-molded product to be obtained.

Further, the latex composition of the present invention may further contain a crosslinking accelerator within the range capable of suppressing the onset of symptoms of delayed allergy (Type IV) in the molded film such as a dip-molded product to be obtained.

As the crosslinking accelerator, crosslinking accelerators that are generally used in chip molding can be used, and examples thereof include dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthio carbaylthio)benzothiazole, 2-(2,6-dimethyl-4-morpholinothio)benzothiazole, 2-(4'-morpholino dithio)benzothiazole, 4-morpholinyl-2-benzothiazyl disulfide, 1,3-bis (2-benzothiazyl mercaptomethyl)urea, and the like. Zinc diethyldithiocarbamate, 2 zinc dibutyldithiocarbamate, and zinc 2-mercaptobenzothiazole are preferable. One of the crosslinking accelerators may be used alone, or two or more of them may be used in combination.

The latex composition of the present invention can further contain compounding agents including anti-aging agents; dispersants; reinforces such as carbon black, silica, and talc; fillers such as calcium carbonate and clay; ultraviolet absorbers; and plasticizers, as required.

Examples of the anti-aging agents include phenolic anti-aging agents containing no sulfur atoms such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenated phenol, 2,2'-methylene-bis(6-α-methyl-benzyl-p-cresol), 4,4'-methylenebis (2,6-di-t-butylphenol), 2,2'-methylene-bis (4-methyl-6-t-butylphenol), alkylated bisphenol, and a butylated reaction product of cresol with dicyclopentadiene; thiobisphenol anti-aging agents such as 2,2'-thiobis-(4-methyl-6-t-butylphenol), 4,4'-thiobis-(6-t-butyl-o-cresol), and 2,6-di-t-butyl-4-(4,6-bis(octylthio)-1,3,5-triazin-2-ylamino) phenol; phosphite ester anti-aging agents such as tris (nonylphenyl) phosphite, diphenylisodecyl phosphite, and tetraphenyl dipropylene glycol diphosphite; sulfur ester anti-aging agents such as dilauryl thiodipropionate; amine anti-aging agents such as phenyl-α-naphthyl amine, phenyl-β-naphthyl amine, p-(p-toluenesulfonylamide)-diphenylamine, 4,4'-(α,α-dimethylbenzyl) diphenylamine, N,N-diphenyl-p-phenylenediamine, N-isopropyl-N'-phenyl-p-phenylenediamine, and butyl aldehyde-aniline condensate; quinoline anti-aging agents such as 6-ethoxy-2,2,4-trimethyl-1,2-dihydroquinoline; and hydroquinone anti-aging agents such as 2,5-di-(t-amyl)hydroquinone. One of these anti-aging agents can be used alone, or two or more of them can be used in combination.

The content of the anti-aging agent is preferably 0.05 to 10 parts by weight, more preferably 0.1 to 5 parts by weight, with respect to 100 parts by weight of the carboxy-modified conjugated diene polymer.

The method for mixing various expounding agents in the latex composition of the present invention is not specifically limited, but examples thereof include a method of obtaining a latex composition containing a carboxy-modified conjugated diene polymer latex, a xanthogen compound, and a metal oxide, as described above and thereafter mixing various compounding agents to be mixed in the latex composition, as required, using a disperser such as a ball mill, a kneader, and a disperser, a method of preparing an aqueous dispersion of ingredients other than the carboxy-modified conjugated diene polymer latex and thereafter mixing the aqueous dispersion in the carboxy-modified conjugated diene polymer latex using the aforementioned disperser, and the like.

The solid content concentration of the latex composition of the present invention is preferably 10 to 60 wt %, more preferably 10 to 55 wt %.

In the case of containing a sulfur vulcanizing agent, the latex composition of the present invention is preferably aged (pre-crosslinked) before dip molding, for further enhancing the mechanical properties of the molded film such as a dip-molded product to be obtained. The precrosslinking time is not specifically limited and depends also on the precrosslinking temperature but is preferably 1 to days, more preferably 1 to 7 days. Me precrosslinking temperature is preferably 20 to 40° C.

Then, after the precrosslinking, the latex composition is preferably stored at a temperature of 10 to 30° C. until the dip molding. If the latex composition is stared at high temperature, the tensile strength of a molded film such as a dip-molded product to be obtained may possibly decrease in some cases.

Molded Film

The molded film of the present invention is a molded product in the form of a film composed of the latex composition of the present invention. The film thickness of the molded film of the present invention is preferably 0.03 to 0.50 mm, more preferably 0.05 to 0.40 mm, particularly preferably 0.08 to 0.30 mm.

The molded film of the present invention is not specifically limited but is suitably a dip-molded product obtained by dip-molding the latex composition of the present invention. The dip molding is a method of immersing a mold in the latex composition depositing the composition on the surface of the mold, then pulling the mold out of the composition, and thereafter drying the composition deposited on the surface of the mold. The mold before the immersion in the latex composition way be preheated. Further, before the mold is immersed in the latex composition or after the mold is pulled out of the latex composition, a coagulant can be used, as required.

Specific examples of the method for using the coagulant include a method of attaching the coagulant to the mold by immersing, in a coagulant solution, the mold before the immersion in the latex composition (anode coagulant dipping), and a method of immersing the mold on which the latex composition has been deposited in a coagulant solution (Teague coagulant dipping), and the anode coagulant dipping is preferable in that a dip-molded product with less unevenness in thickness is obtained.

Specific examples of the coagulant include a water-soluble polyvalent metal salt including a metal halide such as barium chloride, calcium chloride, magnesium chloride, zinc chloride, and aluminum chloride; a nitrate such as barium nitrate, calcium nitrate, and zinc nitrate; an acetate such as barium acetate, calcium acetate, and zinc acetate; and a sulfate such as calcium sulfate, magnesium sulfate, and aluminum sulfate. Among these, a calcium salt is preferable, and calcium nitrate is more preferable. One of these water-soluble polyvalent metal salts can be used alone, or two or more of them can be used in combination.

The coagulant can be generally used as a solution of water, alcohol, or a mixture thereof and is preferably used in the font of an aqueous solution. The aqueous solution may further contain water-soluble organic solvents such as methanol and ethanol, and nonionic surfactants. The concentration of the coagulant differs depending on the type of the water-soluble polyvalent metal salts but is preferably 5 to 50 wt %, more preferably 10 to 30 wt %.

The mold after being pulled out of the latex composition is generally heated to dry the deposit formed on the mold. The drying conditions may be appropriately selected.

In the case where the latex composition contains a crosslinking agent, the dip-molded layer obtained is generally subjected to heat treatment for crosslinking. Before the heat treatment, immersion in water, preferably hot water at 30 to 70° C., for about 1 to 60 minutes may be performed to remove water-soluble impurities (such as excess emulsifiers and coagulants). Water-soluble impurities may be removed after the heat treatment of the dip-molded layer but are preferably removed before the heat treatment since water-soluble impurities can be removed more efficiently.

The dip-molded layer is crosslinked by heat treatment generally at a temperature of 80 to 150° C., preferably for 10 to 130 minutes. As a heating method, methods by external heating using infrared rays or heated air, or internal heating using high-frequency waves can be employed. Among these, external heating using heated air is preferable.

Then, a dip-molded product is obtained as a molded film by detaching the dip-molded layer from the mold for dip molding. As a detaching method, methods of peeling the film from the mold for forming by hand and peeling the film by water pressure or pressure of compressed air can be employed. After the detachment, heat treatment at a temperature of 60 to 120° C. for 10 to 120 minutes may be further performed.

The molded film of the present invention may be obtained by any method other than the method of dip-molding the latex composition of the present invention as long as the method enables formation of the latex composition of the present invention into a film (such as coating method).

The molded film of the present invention containing the dip-molded product of the present invention is obtained using the latex composition of the present invention and thus has excellent flexibility and also excellent tear strength. Therefore, the molded film of the present invention can be used particularly suitably, for example, as a glove. In the case where the molded film forms a glove, inorganic fine particles such as talc and calcium carbonate or organic fine particles such as starch particles may be spread on the surface of the glove, an elastomer layer containing fine particles may be formed on the surface of the glove, or the surface layer of the glove may be chlorinated, in order to prevent the close contact on the contact surface of the molded film with itself and improve slippage when putting it on and taking it off.

Further, the molded film of the present invention containing the dip-molded product of the present invention can be used as medical supplies such as baby bottle nipples, droppers, tubes, water pillows, balloon stalls, catheters, and condoms; toys such as balloons, dolls, and balls, industrial supplies such as pressure molding tags and gas storage bags; fingerstalls; and the like, other than the aforementioned glove.

Adhesive Composition

In the present invention, the latex composition of the present invention can be used as an adhesive composition.

The content (solid content) of the latex composition in the adhesive composition is preferably 5 to 60 wt %, more preferably 10 to 30 wt %.

The adhesive composition preferably contains an adhesive resin in addition to the latex composition of the present invention. The adhesive resin is not specifically limited, but a resorcinol-formaldehyde resin, a melamine resin, an epoxy resin, and an isocyanate resin, for example, can be suitably used. Among these, a resorcinol-formaldehyde resin is preferable. A known resorcinol-formaldehyde resin (such as disclosure of Japanese Patent Application Laid-Open No. 55-142635) can be used. The reaction ratio of resorcinol to formaldehyde is generally 1:1 to 1:5, preferably 1:1 to 1:3, in terms of the molar ratio of "resorcinol:formaldehyde".

For further enhancing the adhesion of the adhesive composition, the adhesive composition can contain 2,6-bis(2,4-dihydroxyphenyl methyl)-4-chlorophenol or a similar compound, isocyanate, block isocyanate, ethylene urea, polyepoxide, modified polyvinyl chloride resin, and the like, which are conventionally used.

Further, the adhesive composition can contain a vulcanization aid. Containing a vulcanization aid can improve the mechanical strength of the later-described composite to be obtained using the adhesive composition. Examples of the vulcanization aid can include quinone dioximes such as p-quinone dioxime; methacrylic acid esters such as lauryl methacrylate and methyl methacrylate; allyl compounds such as DAF (diallyl fumarate), DAP (diallyl phthalate), TAC (triallyl cyanurate), and TAIC (triallyl isocyanurate); maleimide compounds such as bismaleimide, phenyl maleimide, and N,N-m-phenylene dimaleimide; sulfurs; and the like.

Adhesive Layer-Forming Substrate

The adhesive layer-forming substrate of the present invention is obtained by an adhesive layer formed using the latex composition or the adhesive composition of the present invention on a surface of a substrate.

The substrate is not specifically limited, but a fiber sur for example, can be used. The type of fibers constituting the fiber substrate is not specifically limited, and examples thereof include vinylon fibers, polyester fibers, polyimide fibers such as nylon and aramid (aromatic polyamide), glass fibers, cottons, rayons, and the like. These can be appropriately selected corresponding to the application. The shape of the fiber substrate is not specifically limited, and examples thereof can include shapes of staples, filaments, cords, ropes, woven fabrics (such as canvas), and the like, which can be appropriately selected corresponding to the application. For example, the adhesive layer-forming substrate can be used as a substrate-rubber composite by adhering to rubber via an adhesive layer. The substrate-rubber composite is not specifically limited, but examples thereof include a toothed rubber belt with a core using a fiber substrate in, the form of a cord, a toothed rubber belt using a fiber substrate in the form of a base fabric such as a canvas, and the like.

The method for obtaining the substrate-rubber composite is not specifically limited, but examples thereof include a method of attaching the adhesive composition to a substrate, for example, by immersion and the like to obtain an adhesive layer-forming substrate and placing the adhesive layer-forming substrate on rubber, followed by heating and pressurization. The pressurization can be performed using a compression (press) molding machine, a metal roll, an injection molding machine, and the like. The pressure for the pressurization is preferably 0.5 to 20 MPa, more preferably 2 to 10 MPa. The heating temperature is preferably 130 to 300° C., more preferably 150 to 250° C. The heating and pressurization time is preferably 1 to 180 minutes, more preferably 5 to 120 minutes. The heating and pressurization method enables molding of rubber and adhesion between the adhesive layer-forming substrate and the rubber to be performed simultaneously. A mold for imparting a desired surface shape to the rubber of the substrate-rubber composite as a target is preferably formed on the inner surface of the mold of the compressor or the surface of the roll used for the pressurization.

Further, one aspect of the substrate-rubber composite can include a substrate-rubber-substrate composite. The substrate-rubber-substrate composite can be formed, for example, by combining a substrate (which may be a composite of two or more substrates) with the substrate-rubber composite. Specifically, a core serving as a substrate and a base fabric serving as rubber and a substrate are layered (at this time, the adhesive composition has been appropriately attached to the core and the base fabric to form an adhesive layer-forming substrate), followed by pressurization under heating, so that a substrate-rubber-substrate composite can be obtained.

The substrate-rubber composite to be obtained using the adhesive layer-forming substrate of the present invention is excellent in mechanical strength, abrasion resistance, and water resistance and therefore can be suitably used as a belt such as a flat belt, a V belt, a V-ribbed belt, a round belt, a square belt, and a toothed belt. Further, the substrate-rubber composite to be obtained using the adhesive layer-forming substrate of the present invention is excellent in oil resistance and can be suitably used as an in-oil belt. Further, the substrate-rubber composite to be obtained using the adhesive layer-forming substrate of the present invention can be suitably used also for hoses, tubes, diaphragms, and the like.

Examples of the hoses include single-tube rubber hoses, multilayer rubber hoses, braided reinforced hoses, fabric-wrapped reinforced hoses, and the like. Examples of the diaphragms include flat diaphragms, rolling diaphragms, and the like.

The substrate-rubber composite to be obtained using the adhesive layer-forming substrate of the present invention can be used also as industrial products such as seals and rubber rolls other than the aforementioned applications. Examples of the seals include seals for moving pants such as rotating, swinging, and reciprocating parts and seals for fixed parts. Examples of the seals for moving parts include oil seals, piston seals, mechanical seals, boots, dust covers, diaphragms, accumulators, and the like. Examples of the seals for fixed parts include o-rings, various gaskets, and the like. Examples of the rubber rolls include rolls that are parts of OA equipment such as printing equipment and copy equipment; fiber processing rolls such as stretching rolls for spinning and draft rolls for spinning; steel rolls such as bridle rolls, snubber rolls, and steering rolls; and the like.

EXAMPLES

Hereinafter, the present invention will be specifically described with reference to the However, the present invention is not limited to these examples. The "part(s)" below is based on weight, unless otherwise specified. Various physical properties were measured as follows.

Solid Content Concentration 2 g of each sample was accurately weighed (weight: X2) into an aluminum dish (weight: X1), followed by drying in a hot air dryer at 105° C. for 2 hours. Subsequently, after cooling in a desiccator, the weight thereof including the aluminum dish was measured (weight: X3), to calculate the solid content concentration according to the following calculation formula.

Solid content concentration wt %=(X3−X1)×100/X2

Content of Aggregates

After the latex composition was allowed to stand still at 30° C. for 7 days, the solid content concentration of the latex composition was measured according to the aforementioned Method, and 100 g of the latex composition was accurately weighed and was thereafter filtered with a 200-mesh SUS wire screen of known weight. Then, aggregates on the wire sore were washed with water several times, to remove the latex composition. The aggregates were dried at 105° C. for 2 hours or more, and thereafter the dry weight was measured to determine the content of aggregates (unit: wt %) based on the formula below.

Content of aggregates (wt %)={(α−β)/(γ×Δ)}×10,000

Here, α represents the weight of the wire screen after drying and the dry aggregates, β represents the weight of the wire screen, γ represents the weight of the latex composition, and Δ represents the solid content concentration of the latex composition, respectively.

Patch Test

Test specimens Obtained by cutting a dip-molded product in the form of a film with a film thickness of about 0.2 mm into a size of 10×10 mm were attached respectively to the arms of 10 subjects. Thereafter, the attached portions were observed after 48 hours to check whether allergic symptoms of delayed allergy (Type IV) occurred, and evaluation was made according to the following criteria.

A: No allergic symptoms were observed in all of the subjects.
B: Allergic symptoms were observed in a part of the subjects.

Tensile Strength and Tensile Elongation of Dip-Molded Product

Based on ASTM D412, a film-like dip-molded product with a film thickness of about 0.2 mm was punched out using a dumbbell (product name "SUPER DUMBBELL (type: SDMK-100C)" manufactured by DUMBBELL CO., LTD.), to produce a test piece for tensile strength measurement. The test specimens were stretched at a tensile speed of 500 mm/min using a TENSILON Universal Material Testing Instrument (product name "RT G-1210", available from ORIENTEC CORPORATION), and the tensile strength immediately before break (unit: MPa) and the elongation immediately before break (unit: %) were measured.

Preparation Example 1

Production of Carboxy-Modified Synthetic Polyisoprene (A-1) Latex

Synthetic polyisoprene (product name "NIPOL IR2200L", available from Zeon Corporation, isoprene homopolymer, and amount of cis-bond units: 98%) with a weight-average molecular weight of 1,300,000 was indexed with cyclohexane and dissolved therein by raising the temperature to 60° C. under stirring, to prepare a cyclohexane solution (a) of synthetic polyisoprene (solid content concentration: 8 wt %) with a viscosity, as measured using a type B viscometer, of 12,000 mPa·s.

Meanwhile, 20 parts of sodium rosinate was added to water and dissolved therein $^{by}$ raising the temperature to 60° C., to pre are an anionic surfactant aqueous solution (b) with a concentration of 1.5 wt %.

Next, the cyclohexane solution (a) and the anionic surfactant aqueous solution (b) were mixed at a weight ratio of 1:1.5 using a mixer (product name "Multi Line mixer MS26-MMR-5,5L", available from SATAKE CHEMICAL EQUIPMENT MFG., LTD.) and then were mixed and emulsified at a rotational speed of 4100 rpm using an emulsifying device (product name "MILDER MDN310", available from Pacific Machinery & Engineering Co., Ltd.), to obtain an emulsified liquid (c). At that time, the total feed flow rate of the cyclohexane solution (a) and the anionic surfactant aqueous solution (1)) was 2,000 kg/hr, the temperature was 60° C., and the back pressure (gauge pressure) was 0.5 MPa.

Subsequently, the emulsified liquid (c) was heated to 80° C. under reduced pressure of −0.01 to −0.09 MPa (gauge pressure), thereby distilling off cyclohexane, to obtain an aqueous dispersion (d) of synthetic polyisoprene. At that time, a defoamer (product name "SM5515", available from Dow Corning Toray Co., Ltd.) was continuously added by spraying in amount of 300 ppm by weight with respect to synthetic polyisoprene in the emulsified liquid (c). When distilling off cyclohexane, the emulsified liquid (c) was adjusted to 70 vol % or less of the tank volume, and stirring was gradually conducted at 60 rpm using a three-stage inclined paddle blade as a stirring blade.

After the completion of distilling off cyclohexane, the aqueous dispersion (d) of synthetic polyisoprene obtained was centrifuged at 4,000 to 5,000 G using a continuous centrifuge (product name "SRG510", available from Alfa Laval AB), to obtain synthetic polyisoprene latex (e) with a solid content concentration of 56 wt % as a light liquid. The centrifugation conditions of a solid content concentration of the aqueous dispersion (d) before centrifugation of 10 wt %, a flow rate during continuous centrifugation of 1300 kg/hr, and a back pressure (gauge pressure) of the centrifuge of 1.5 MPa were employed. The synthetic polyisoprene latex (e) obtained had a solid content concentration of 60 wt %.

Subsequently, 850 parts of distilled water was added to 100 parts of synthetic polyisoprene in the synthetic polyisoprene latex (e) obtained for dilution. The thus diluted latex, was introduced into a nitrogen-purged polymerization reaction container equipped with stirrer, followed by heating to a temperature of 30° C. under stirring. Further, parts of methacrylic acid and 16 parts of distilled water were mixed using another container, to prepare a methacrylic acid diluent. The methacrylic acid diluent was added to the polymerization reaction container heated to 30° C. over 30 minutes.

Further, a solution (f) composed of 7 parts of distilled water, 0.32 parts of sodium formaldehyde sulfoxylate (product name "SFS", available from MITSUBISHI GAS CHEMICAL COMPANY, INC.), 0.01 parts of ferrous sulfate (product name "Frost Fe", available from CHELEST CORPORATION) was prepared using another container. After the solution (f) was added into the polymerization reaction container, 0.5 parts of 1,1,3,3-tetramethylbutyl hydroperoxide (product name "PEROCTA H" available from NOF CORPORATION) was added thereto to react at 30° C. for 1 hour and further react at 70° C. for 2 hours, so that synthetic polyisoprene was graft-polymerized with methacrylic acid. The conversion rate of the graft polymerization was 99 wt %.

Subsequently, sodium hydroxide was added thereto to adjust the pH to 10, and thereafter it was centrifuged (with a flow rate of 1700 kg/hr and a back pressure (gauge pressure) of the centrifuge of 0.08 MPa) at 4,000 to 5,000 G using a continuous centrifuge (product name "SRG510", available from Alfa Laval AB), to obtain carboxy-modified synthetic polyisoprene (A-1) latex with a solid content concentration of 55 wt %. The composition of the carry-modified synthetic polyisoprene (A-1) contained in the latex obtained was composed of 99.8 wt % of isoprene units and 0.2 wt % of methacrylic acid units.

Preparation Example 2

Production of Carboxy-Modified Synthetic Polyisoprene (A-2) Latex

Carboxy-modified synthetic polyisoprene (A-2) latex with a solid content concentration of 55% was obtained in the same manner as in Preparation Example 1 except that the amount of methacrylic acid used was changed from 2 parts to 5 parts. The composition of the carboxy-modified synthetic polyisoprene (A-2) contained in the latex obtained was composed of 99 wt % of isoprene units and 1 wt % of methacrylic acid units.

Preparation Example 3

Production of Carboxy-Modified Synthetic Polyisoprene (A-3) Latex

Carboxy-modified synthetic polyisoprene (A-3) latex with a solid content concentration of 55% was obtained in the same manner as in Preparation Example 1 except that the amount of methacrylic acid used was changed from 2 parts to 10 parts. The composition of the carboxy-modified synthetic polyisoprene (A-3) contained in the latex obtained was composed of 95 wt % of isoprene units and 5 wt % of methacrylic acid units.

Example 1

Preparation of Latex Composition

First, 100% of carboxyl groups in a styrene-maleic acid mono-sec-butyl ester-maleic acid mono methyl ester polymer (product name "Scripset550", available from. Hercules Inc.) were neutralized with sodium hydroxide, to prepare a sodium salt aqueous solution (pith a concentration of 10 wt n) serving as a dispersant (g). Then, the dispersant (g) was added to the carboxy-modified synthetic polyisoprene (A-1) latex obtained in Preparation Example 1 in an amount of 0.8 parts in terms of solid content with respect to 100 parts of the carboxy-modified synthetic polyisoprene (A-1), to obtain a mixture.

Then, 2 parts of zinc diisopropyl xanthate as a xanthogen compound was added to 100 parts of the carboxy-modified synthetic polyisoprene (A-1) in the mixture under stirring the mixture obtained.

Subsequently, aqueous dispersions of compounding agents were added in amounts of 1.5 parts of zinc oxide as a metal oxide, 1.5 parts of sulfur, and 2 parts of an anti-aging agent (product name "Wingstay L", available from Goodyear Tire and Rubber Company) in terms of solid content, to obtain a latex composition. Then, the content of aggregates in some latex compositions obtained was measured according to the aforementioned method. Table 1 shows the results. Meanwhile, latex compositions for which the content of aggregates was not measured were aged in a constant-temperature water bath adjusted to 30° C. for 48 hours.

Production of Dip-Molded Product

A commercially available ceramic hand mold (manufactured by SHINKO CERAMICS CO., LTD.) was washed, followed by preheating in an oven at 70° C. Thereafter, the hand mold was immersed in an aqueous solution of a coagulant containing 18 wt % of calcium nitrate and 0.05 wt % of polyoxyethylene lauryl ether (product name "EMULGEN 109P", manufactured by Kao Corporation) for 5 seconds and was taken out of the aqueous solution of the coagulant. Subsequently, the hand mold was dried in an oven at 70° C. for 30 minutes or more, thereby allowing the coagulant to adhere to the hand mold, so that the hand mold was coated with the coagulant.

Thereafter, the hand mold coated with the coagulant was taken out of the oven, and it was immersed for 10 seconds in the latex composition after aging. Subsequently, the hand mold was air-dried at roar, temperature for 10 minutes and was immersed in hot water at 60° C. for 5 minutes to elute water-soluble impurities, thereby forming a dip-molded layer on the hand mold. Thereafter, the dip-molded layer formed on the hand mold was crosslinked by heating in an oven under the conditions of a temperature of 130° C. for 30 minutes, followed by cooling to room temperature, and was separated from the hand mold after spreading talc, to obtain a dip-molded product (rubber glove). Then, the dip-molded product (rubber glove) obtained was subjected to the patch test and evaluation of the tensile strength and the tensile elongation according to the aforementioned methods. Table 1 shows the results.

Example 2

A latex composition and a dip-molded product (rubber glove) were produced in the same manner as in Example 1 except that the carboxy-modified synthetic polyisoprene (A-2) latex obtained in Preparation Example 2 (100 parts in terms of the carboxy-modified synthetic polyisoprene (A-2)) was used in preparation of the latex composition, instead of the carboxy-modified synthetic polyisoprene (A-1) latex obtained in Preparation Example 1, and were evaluated in the same manner. Table 1 shows the results.

Example 3

A latex composition and a dip-molded product (rubber glove) were produced in the same manner as in Example 1 except that the carboxy-modified synthetic polyisoprene (A-3) latex obtained in Preparation Example 3 (100 parts in terms of the carboxy-modified synthetic polyisoprene (A-3)) was used in preparation of the latex composition, instead of the carboxy-modified synthetic polyisoprene (A-1) latex obtained in Preparation Example 1, and were evaluated in the same manner. Table 1 shows the results.

Comparative Example 1

A latex composition and a dip-molded product (rubber glove) were produced in the same manner as in Example 1 except that the synthetic polyisoprene latex (e) obtained in Preparation Example 1 (100 parts in terms of synthetic polyisoprene) was used, as it was, in preparation of the latex composition, instead of the carboxy-modified synthetic polyisoprene (A-1) latex obtained in Preparation Example 1, and were evaluated in the same manner. Table 1 shows the results.

Comparative Example 2

A latex composition and a dip-molded product (rubber glove) were produced in the same manner as in Example 2 except that zinc diisopropyl xanthate as a xanthogen compound was not added in preparation of the latex composition, and were evaluated in the same manner. Table 1 shows the results.

Comparative Example 3

A latex composition and a dip-molded product (rubber glove) were produced in the same manner as in Example 2 except that 1.5 parts in total of dithiocarbamate vulcanization accelerators and a thiazole vulcanization accelerator (0.3 parts of zinc diethyldithiocarbamate, 0.5 parts of zinc 2 dibutyldithiocarbamate, and 0.7 parts of zinc 2-mercaptobenzothiazole) were added in preparation of the latex composition, instead of 2 parts of zinc diisopropyl xanthate as a xanthogen compound, and were evaluated in the same manner. Table 1 shows the results.

TABLE 1

| | | Example | | | Comparative Example | | |
|---|---|---|---|---|---|---|---|
| | | 1 | 2 | 3 | 1 | 2 | 3 |
| Composition of carboxy-modified synthetic polyisoprene | | | | | | | |
| Isoprene unit | (wt %) | 99.8 | 99 | 95 | 100 | 99 | 99 |
| Methacrylic acid unit | (wt %) | 0.2 | 1 | 5 | | 1 | 1 |
| Content | | | | | | | |
| Carboxy-modified synthetic polyisoprene | (parts) | 100 | 100 | 100 | | 100 | 100 |
| Synthetic polyisoprene | (parts) | | | | 100 | | |
| Zinc xanthate | (parts) | 2 | 2 | 2 | 2 | | |
| Dithiocarbamate vulcanization accelerator and thiazole vulcanization accelerator | (parts) | | | | | | 1.5 |
| Zinc oxide | (parts) | 1.5 | 1.5 | 1.5 | 1.5 | 1.5 | 1.5 |
| Sulfur | (parts) | 1.5 | 1.5 | 1.5 | 1.5 | 1.5 | 1.5 |
| Dispersant | (parts) | 0.8 | 0.8 | 0.8 | 0.8 | 0.8 | 0.8 |
| Resistance to Hardening in Oil Test | | | | | | | |
| Content of aggregates in latex composition | (wt %) | 0.02 | 0.015 | 0.01 | 0.3 | 0.015 | 0.02 |
| Patch test of dip-molded product | | A | A | A | A | A | B |
| Tensile strength of dip-molded product | (MPa) | 21 | 30 | 32 | 13 | 10 | 32 |
| Tensile elongation of dip-molded product | (%) | 1150 | 1000 | 750 | 1300 | 1000 | 1000 |

From Table 1, the latex composition containing a carboxy-modified conjugated diene polymer latex, a xanthogen compound, and a metal oxide had excellent stability since the occurrence of aggregates was suppressed, and further the dip--molded product produced using the latex composition showed good results of the patch test, so that the onset of symptoms of delayed allergy Type IV) was suppressed, and further was excellent in tensile strength and tensile elongation (Examples 1 to 3).

Meanwhile, the latex composition obtained using the synthetic polyisoprene latex that was not carboxy-modified, instead of the carboxy-modified conjugated diene polymer latex caused a large amount of aggregates and had poor stability, and further the dip-molded product produced using the latex composition had poor tensile strength (Comparative Example 1).

Further, in the case where the xanthogen compound was not mixed, the dip-molded product produced using the latex composition obtained had poor tensile strength (Comparative Example 2).

Further, in the case Were dithiocarbamate vulcanization accelerators and a thiazole vulcanization accelerator were mixed, instead of the xanthogen compound, the dip-molded product produced using the latex composition obtained showed poor results of the patch test and caused the symptoms of delayed allergy; Type IV) (Comparative Example 3).

The invention claimed is:

1. A latex composition comprising:
   a carboxy-modified synthetic polyisoprene latex;
   a zinc diisopropyl xanthate; and
   a metal oxide, wherein
   a carboxy-modified synthetic polyisoprene constituting the carboxy-modified synthetic polyisoprene latex is a polymer obtained by modifying a synthetic polyisoprene with a monomer having a carboxyl group selected from the group consisting of acrylic acid and methacrylic acid, and a content of isoprene unit in the synthetic polyisoprene is 95 wt % or more with respect to the total monomer unit,
   a content of the zinc diisopropyl xanthate is 0.01 to 10 parts by weight, with respect to 100 parts by weight of the carboxy-modified synthetic polyisoprene contained in the carboxy-modified synthetic polyisoprene latex, and
   the latex composition is free from dithiocarbamate vulcanization accelerators and thiazole vulcanization accelerators.

2. The latex composition according to claim 1, wherein a modification rate by carboxyl groups in the carboxy-modified synthetic polyisoprene contained in the carboxy-modified synthetic polyisoprene latex, as calculated based on (the number of carboxyl groups/the total number of monomer units of the carboxy-modified synthetic polyisoprene)×100 is 0.01 to 5%.

3. The latex composition according to claim 1, further comprising a sulfur vulcanizing agent.

4. The latex composition according to claim 1, wherein a modification rate by carboxyl groups in the carboxy-modified synthetic polyisoprene contained in the carboxy-modified synthetic polyisoprene latex, as calculated based on (the number of carboxyl groups/the total number of monomer units of the carboxy-modified synthetic polyisoprene)×100 is 0.2 to 5%.

5. The latex composition according to claim 1, wherein the content of the zinc diisopropyl xanthate is 0.5 to 5 parts by weight, with respect to 100 parts by weight of the carboxy-modified synthetic polyisoprene contained in the carboxy-modified synthetic polyisoprene latex.

6. The latex composition according to claim 1, wherein a modification rate by carboxyl groups in the carboxy-modified synthetic polyisoprene contained in the carboxy-modified synthetic polyisoprene latex, as calculated based on (the number of carboxyl groups/the total number of monomer units of the carboxy-modified synthetic polyisoprene)×100 is 0.2 to 5%, and
the content of the zinc diisopropyl xanthate is 0.5 to 5 parts by weight, with respect to 100 parts by weight of the carboxy-modified synthetic polyisoprene contained in the carboxy-modified synthetic polyisoprene latex.

7. A method for production of a molded film comprising molding the latex composition according to claim 1 into a film.

8. A method for production of an adhesive layer-forming substrate comprising forming an adhesive layer comprising the latex composition according to claim 1 on a surface of a substrate.

* * * * *